(12) United States Patent
Yoda

(10) Patent No.: US 6,604,073 B2
(45) Date of Patent: Aug. 5, 2003

(54) VOICE RECOGNITION APPARATUS

(75) Inventor: Shoutarou Yoda, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/949,858

(22) Filed: Sep. 12, 2001

(65) Prior Publication Data

US 2002/0035475 A1 Mar. 21, 2002

(30) Foreign Application Priority Data

Sep. 12, 2000 (JP) ........................................ 2000-276123

(51) Int. Cl.[7] .................. G10L 15/02; G10L 15/26; G10L 13/08; G10L 15/04; G10L 13/06

(52) U.S. Cl. ................. 704/231; 704/235; 704/260; 704/236; 704/252; 704/266

(58) Field of Search ................ 704/231, 251, 704/248, 236, 252, 255, 256, 235, 260, 266

(56) References Cited

U.S. PATENT DOCUMENTS

| 6,249,763 | B1 | * | 6/2001 | Minematsu | .................. 704/252 |
| 6,401,065 | B1 | * | 6/2002 | Kanevsky et al. | .......... 704/256 |
| 6,484,136 | B1 | * | 11/2002 | Kanevsky et al. | .......... 704/255 |

FOREIGN PATENT DOCUMENTS

| EP | 0 683 481 A2 | | 11/1995 | |
| JP | 2000-187499 | * | 4/1993 | ............. G10L/3/00 |
| JP | 09-198082 | * | 7/1997 | ............. G10L/3/00 |
| JP | 07-306692 | * | 12/1998 | ........... G10L/15/28 |
| JP | 11-352987 | * | 12/1999 | ............. G10L/3/00 |
| JP | 2001-352595 | * | 12/2001 | ............. H04R/3/00 |

OTHER PUBLICATIONS

Cuetos De P et al.: "Audio–Visual Intent–to–Speak Detection For Human–Computer Interaction" 2000 IEEE International Conference On Acoustics, Speech, And Signal Processing Proceedings, vol. 4 of 6, Jun. 5, 2000 pp. 2373–2376 abstract.

* cited by examiner

*Primary Examiner*—Doris H. To
*Assistant Examiner*—Daniel A. Nolan
(74) *Attorney, Agent, or Firm*—Sughrue Mion, PLLC

(57) ABSTRACT

Disclosed is a voice recognition apparatus which can prevent an erroneous manipulation due to erroneous voice recognition from being carried out even in a noisy environment. As long as a duration of utterance acquired based on the level of a voice signal uttered by an operator (user) approximately coincides with a duration of utterance acquired based on mouth image data acquired by capturing the mouth of the operator, the voice recognition apparatus outputs vocal-manipulation phrase data as the result of voice recognition.

13 Claims, 6 Drawing Sheets

FIG. 2

| KEY OPERATION | OPERATION CODE | VOCAL-MANIPULATION PHRASE (DATA) | NUMBER-OF-MOUTH-SHAPE-CHANGE INFORMATION $M_A$ |
|---|---|---|---|
| [HOME KEY] | HOME | JITAKU | 3 |
| [ADDRESS KEY] | ADDR | JYUSYO | 2 |
| [GENRE KEY] | JYAN | JYANRU | 3 |
| [ZOOM-IN KEY] | WIDE | KAKUDAI | 4 |
| [ZOOM-OUT KEY] | SMAL | SYUKUSHO | 3 |

VOICE RECOGNITION APPARATUS

BACKGROUND OF THE INVENTION

1. Field of the Invention

The present invention relates to a voice recognition apparatus.

2. Description of the Related Art

On-vehicle navigation apparatuses have been put to practical use, which detect the current position of a vehicle using a GPS (Global Positioning System) satellite and display the detected current position together with a map including that position on a display for guidance to a desired destination.

Further, on-vehicle navigation apparatuses equipped with a vocal-manipulation function, which can allow a user to execute various operations based on voices uttered by the user, have appeared today. Using the vocal-manipulation function, the user needs only to utter a phrase for a vocal-manipulation (hereinafter called "vocal-manipulation phrase"), such as "Zoom up the map", to execute a process according to the manipulation. Such an on-vehicle navigation apparatus is equipped with a voice recognition apparatus to manage the vocal-manipulation function.

The voice recognition apparatus first recognizes a vocal-manipulation phrase uttered by a user-on the basis of the waveform of the voice of the user that is acquired through a microphone, and generates an operation code indicating an operation item corresponding to the vocal-manipulation phrase. The on-vehicle navigation apparatus executes an operation indicated by the operation code. When the user utters "Zoom up the map", for example, the voice recognition apparatus recognizes, based on the voice waveform corresponding to the uttered phrase, that the phrase is a vocal-manipulation phrase which requests an operation to magnify the map and generates an operation code to zoom up the map. In accordance with the operation code, the on-vehicle navigation apparatus executes an operation (which will not be elaborated) to zoom up the map shown on the display.

However, there are various kinds of noise, such as driving noise and environmental noise, in a vehicle during driving. The noise itself may be recognized as a part of a voice uttered by a user. This makes it hard for the voice recognition apparatus to accurately recognize a vocal-manipulation phrase uttered by the user. Such erroneous voice recognition leads to an erroneous operation which is unintended by the user.

OBJECT AND SUMMARY OF THE INVENTION

The present invention was accomplished with a view to solving the problems described above, and it is an object of the invention to provide a voice recognition apparatus which can prevent an erroneous manipulation from being carried out due to erroneous voice recognition even under a noise environment.

According to one aspect of the invention, there is provided a voice recognition apparatus for recognizing voice uttered by an operator, comprising a portion for performing a voice recognition process on a voice signal corresponding to the voice to thereby acquire vocal phrase data indicating the uttered phrase; a portion for detecting a point of time when the operator has started uttering the voice and a point of time when the operator has ended uttering the voice on the basis of a signal level of the voice signal to thereby generate first utterance duration information; a portion for capturing a mouth of the operator to acquire mouth image data; a portion for detecting a point of time when the operator has started uttering the voice and a point of time when the operator has ended uttering the voice on the basis of the mouth image data to thereby generate second utterance duration information; and an output portion for outputting the vocal phrase data as long as the first utterance duration information is approximate to the second utterance duration information.

According to another aspect of the invention, there is provided a voice recognition apparatus for recognizing voice uttered by a operator and acquiring vocal phrase data representing a phrase indicated by the voice, comprising: a portion for performing a voice recognition process on a voice signal corresponding to the voice to thereby acquire a plurality of vocal phrase data candidates; a portion for detecting a point of time when the operator has started uttering the voice and a point of time when the operator has ended uttering the voice on the basis of a signal level of the voice signal to thereby generate first utterance duration information; a portion for capturing a mouth of the operator to acquire mouth image data; a portion for detecting a point of time when the operator has started uttering the voice and a point of time when the operator has ended uttering the voice on the basis of the mouth image data to thereby generate second utterance duration information; a portion for counting the number of changes in a shape of the mouth in a duration of utterance indicated by the second utterance duration information on the basis of the mouth image data to thereby generate number-of-mouth-shape-change information; and a portion for selecting that one of the vocal phrase data candidates which has a count of changes in the mouth equal to the count indicated by the number-of-mouth-shape-changes information and outputting the selected vocal phrase data candidate as the vocal phrase data, as long as the first utterance duration information is approximate to the second utterance duration information.

BRIEF DESCRIPTION OF THE DRAWINGS

FIG. 2 is a diagram exemplifying the correlation among key operations, operation codes and number-of-mouth-shape-change information $M_A$;

DETAILED DESCRIPTION OF THE PREFERRED EMBODIMENTS

A preferred embodiment of the invention is described below referring to the accompanying drawings.

Figure 1:
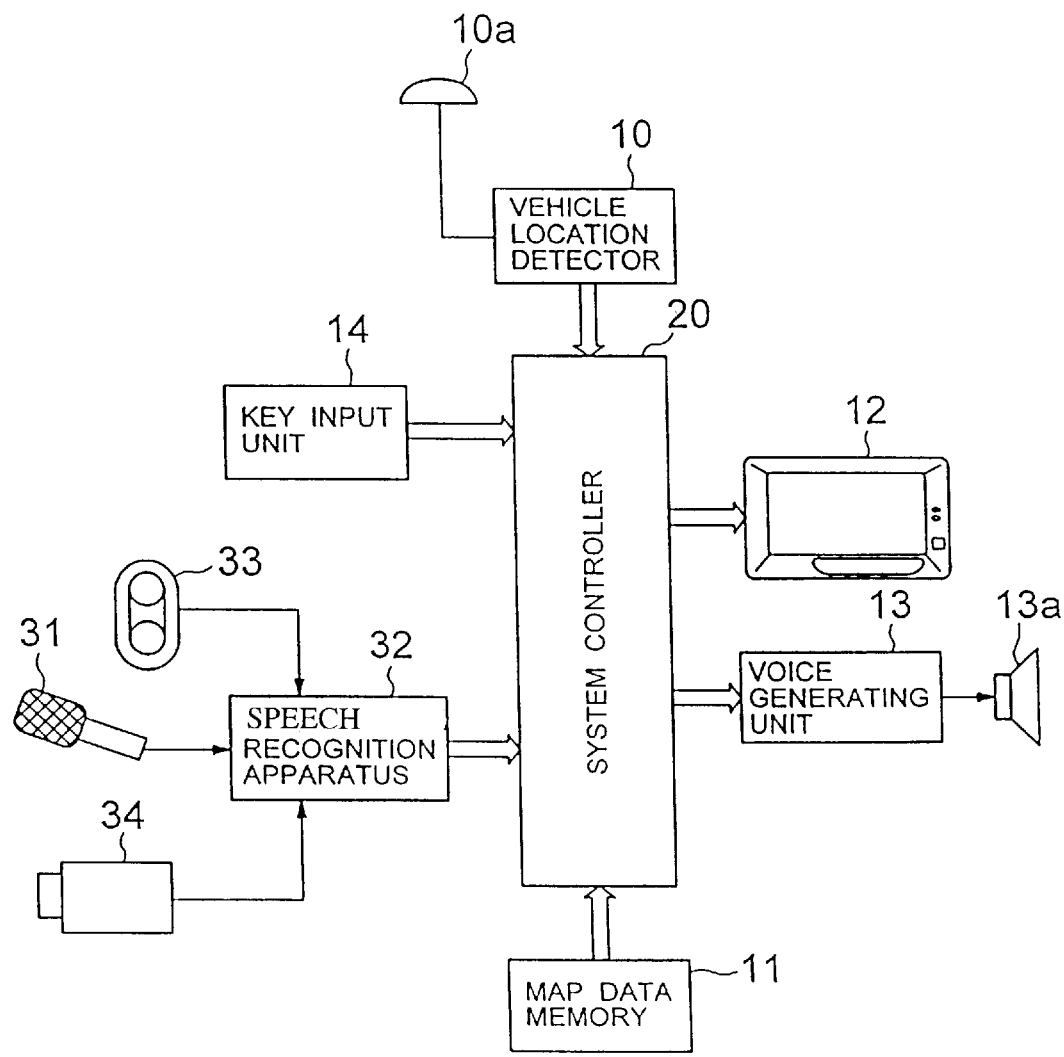
FIG. 1 is a diagram illustrating the structure of an on-vehicle navigation apparatus equipped with a voice recognition apparatus according to the invention.

FIG. 1 is a diagram illustrating the structure of an on-vehicle navigation apparatus equipped with a voice recognition apparatus according to the invention.

In FIG. 1, a vehicle location detector 10 computes the current location of a vehicle on the basis of a radio wave from a GPS (Global Positioning System) satellite which has been received at an antenna 10a, and sends the vehicle location information indicating the location of the local vehicle to a system controller 20.

A map data memory 11 is comprised of an information reproducing unit, which reproduces desired map data from a recording medium, such as CD-ROM or DVD (Digital Versatile Disc), where regionalized map data is stored. The map data memory 11 reads map data, designated by the system controller 20, from the recording medium and sends the map data to the system controller 20.

The system controller 20 executes control according to a vehicle location display routine (not shown) to display a map with a vehicle location mark added thereto on the display screen of a display device 12. Specifically, the system controller 20 first reads out map data including the location indicated by the vehicle location information from the regionalized map data stored in the map data memory 11. Then, the system controller 20 generates display map data which has a vehicle location mark superimposed on the map that is specified by the read map data, and supplies the display map data to the display device 12. Based on the display map data, the display device 12 displays a map with the vehicle location marker on the screen.

Further, the system controller 20 generates voice data corresponding to various kinds of voice announcements to guide the local vehicle to a desired destination, and sends the voice data to a voice generating unit 13. The voice generating unit 13 acoustically outputs a voice based on the voice data via a speaker 13a.

A key input unit 14 accepts a key operation, such as one of those shown in FIG. 2, which is made by a user, generates an operation code corresponding to that key operation and sends the operation code to the system controller 20. The system controller 20 executes an operation according to the operation code.

When the user operates a "zoom-in key" as shown in FIG. 2, for example, the key input unit 14 supplies the system controller 20 with an operation code "WIDE". Then, the system controller 20 reads out a map data which is a one-scale magnification of the map on the screen of the display device 12 from the map data memory 11 in accordance with the operation code "WIDE", and sends the map data to the display device 12. As a result, the display device 12 displays on its screen an image magnified by one scale together with the vehicle location mark.

Figure 3:
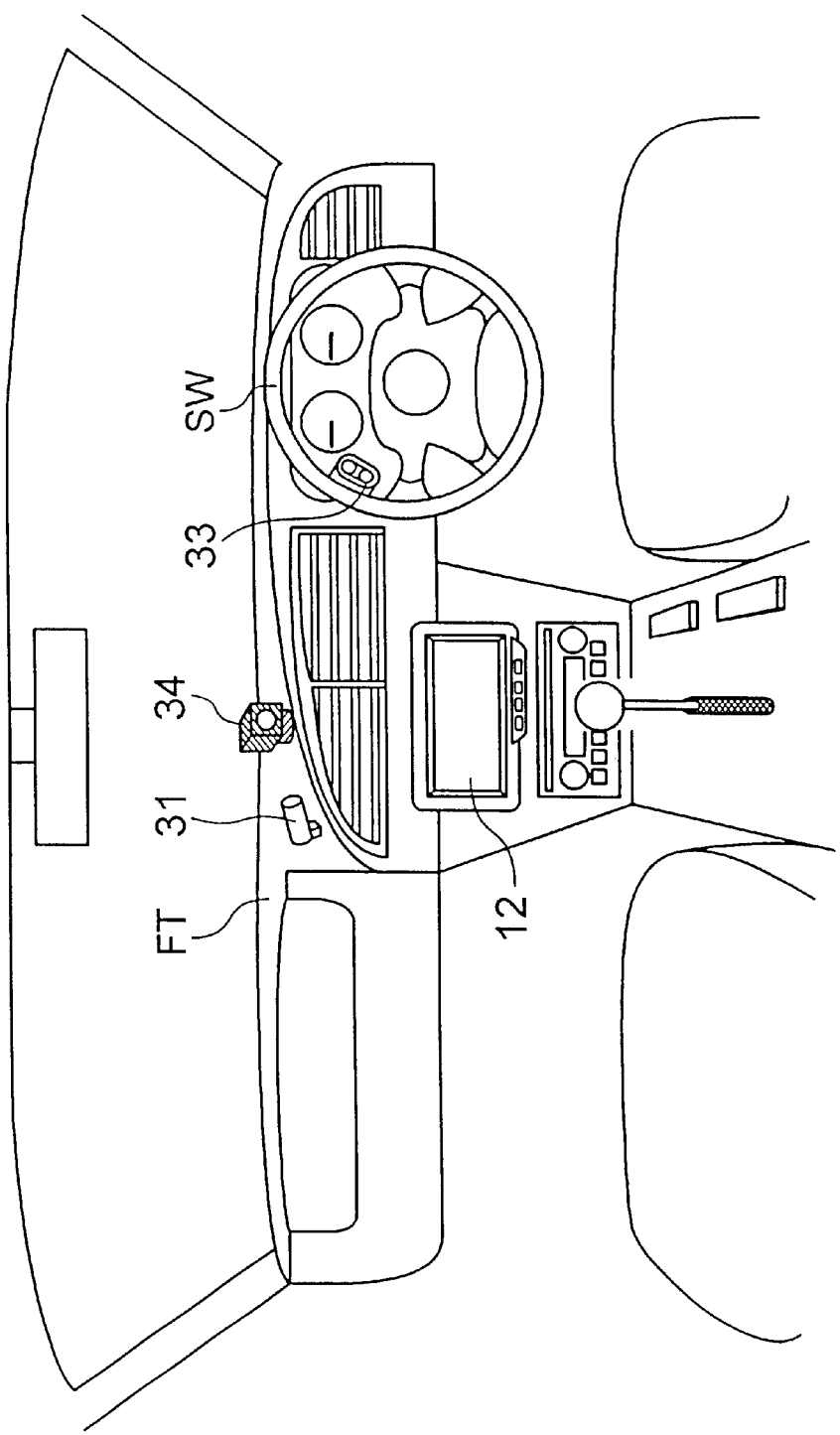
FIG. 3 is a diagram showing an example of the layout of a microphone 31, a talk switch 33 and a video camera 34.

A microphone 31 is mounted on, for example, a front tray FT in the vehicle as shown in FIG. 3. The microphone 31 converts a voice uttered by a driver (user) into a voice signal and sends the signal to a voice recognition apparatus 32. A talk switch 33 is mounted on, for example, a steering wheel SW of the vehicle as shown in FIG. 3. The talk switch 33 generates a vocal-manipulation start signal and sends the signal to the voice recognition apparatus 32 when turned on by the user. When turned off by the user, the talk switch 33 generates a vocal-manipulation end signal and sends the signal to the voice recognition apparatus 32.

A video camera 34 is provided on, for example, the front tray FT in the vehicle as shown in FIG. 3. The video camera 34 supplies the voice recognition apparatus 32 with a video signal which is acquired by capturing the face of the driver.

Figure 4:
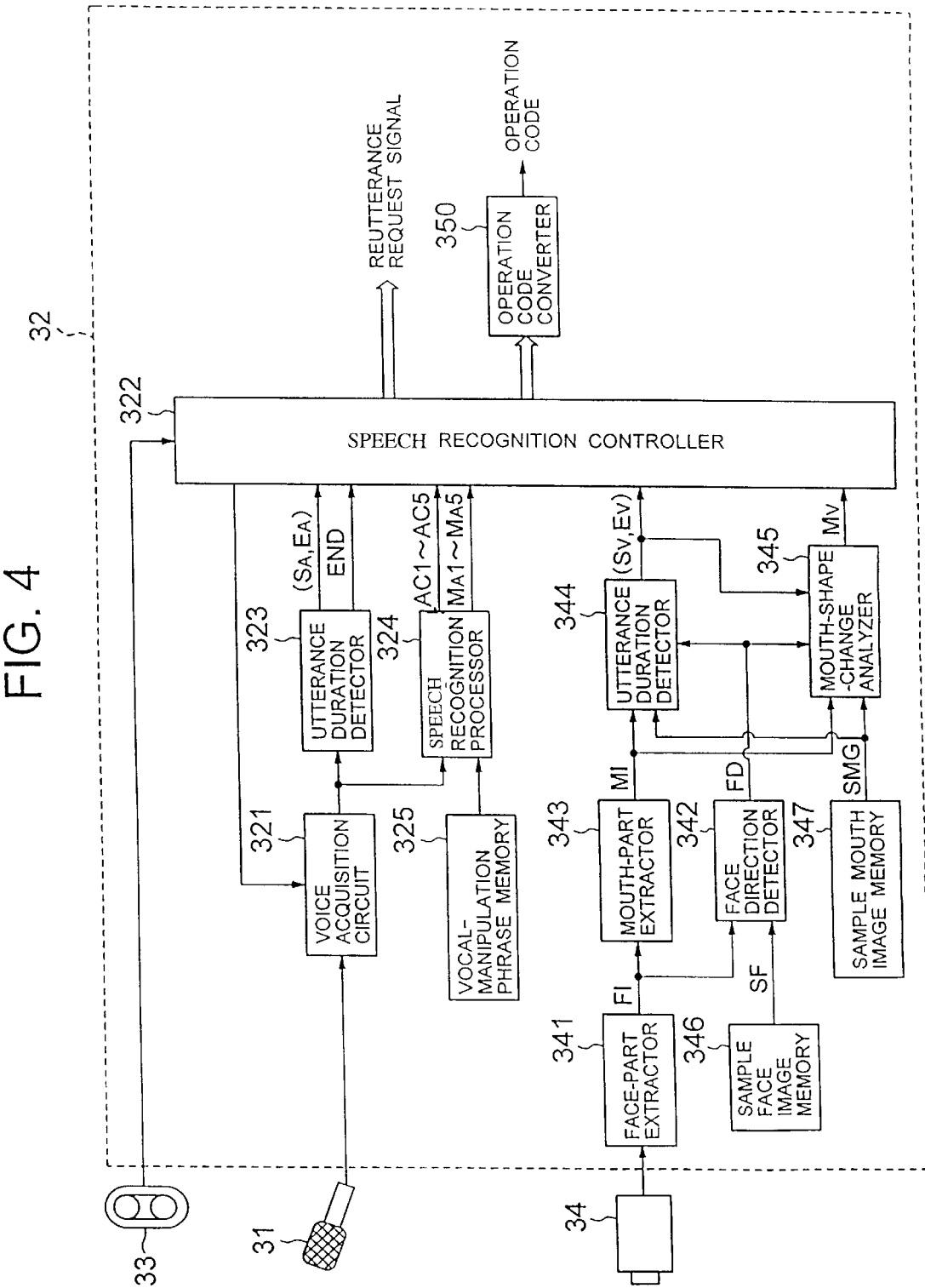
FIG. 4 is a diagram illustrating the internal structure of a voice recognition apparatus 32.

FIG. 4 is a diagram illustrating the internal structure of the voice recognition apparatus 32.

Referring to FIG. 4, upon receiving a voice acquisition command signal from a voice recognition controller 322, a voice acquisition circuit 321 acquires a voice signal supplied from the microphone 31 and sends the voice signal to an utterance duration detector 323 and a voice recognition processor 324. Meanwhile, upon receiving a voice acquisition stop command signal from the voice recognition controller 322, the voice acquisition circuit 321 stops acquiring the voice signal.

When the voice signal, which is not higher than a predetermined level, supplied from the voice acquisition circuit 321 is shifted to higher than the predetermined level, the utterance duration detector 323 determines the point of the level shift as a talk start point and stores the time of the talk start point as a talk start time $S_A$ into an internal register (not shown). When the voice signal higher than the predetermined level is shifted to lower than the predetermined level, the utterance duration detector 323 determines the point of the level shift as a talk end point, generates a talk end detection signal END and sends the signal END to the voice recognition controller 322. Further, the utterance duration detector 323 stores the time of the talk end point as a talk end time $E_A$ into the internal register. Then, the utterance duration detector 323 supplies the voice recognition controller 322 with utterance duration information ($S_A$, $E_A$) indicating the talk start time $S_A$ and the talk end time $E_A$ stored in the internal register.

Vocal-manipulation phrase data indicating a plurality of vocal-manipulation phrases respectively, such as those shown in FIG. 2, which are formed by connecting phonemes or voice elements, are stored in a vocal-manipulation phrase memory 325 beforehand. Each voice element is a basic unit of voice which is formed by a combination of vowels and consonants, such as "CV", "CVC" or "VCV" where V is a vowel and C is a consonant. For example, a vocal-manipulation phrase, "jitaku", shown in FIG. 2 is formed by a sequence of five voice elements "ji", "ita", "ta", "aku" and "ku", and is stored in the vocal-manipulation phrase memory 325 as the vocal-manipulation phrase data. Further, number-of-mouth-shape-change information $M_A$ indicating the count of mouth shape changes when each voice element of the vocal-manipulation phrase is uttered is stored in the vocal-manipulation phrase memory 325 in association with each piece of vocal-manipulation phrase data as shown in FIG. 2.

The voice recognition processor 324 first divides the voice signal supplied from the voice acquisition circuit 321 into frames of, for example, 10 ms, and acquires, frame by frame, a characteristic parameter indicating the characteristic of the waveform in each frame. Then, the voice recognition processor 324 compares the characteristic parameter with each vocal-manipulation phrase data stored in the vocal-manipulation phrase memory 325. As a result, the voice recognition processor 324 selects, for example, five pieces of vocal-manipulation phase data in the high-to-low order of the similarity as vocal-manipulation phrase data candidates AC1 to AC5. The voice recognition processor 324 reads out number-of-mouth-shape-change information $M_A$ corresponding to the vocal-manipulation phrase data candidates AC1 to AC5 as number-of-mouth-shape-change information $M_A1$ to $M_A5$ from the vocal-manipulation phrase memory 325, and sends the number-of-mouth-shape-change information $M_A1$ to $M_A5$ together with the vocal-manipulation phrase data candidates AC1 to AC5 to the voice recognition controller 322.

A face-part extractor 341 extracts only the portion corresponding to the face of the user from video signals supplied from the video camera 34, and sends resultant face image data FI to a face direction detector 342 and a mouth-part extractor 343. The extraction of the face is accomplished by separating an image area corresponding to the face from an image of a scene by binarizing the video signal with, for example, a predetermined first threshold value.

Figure 5:
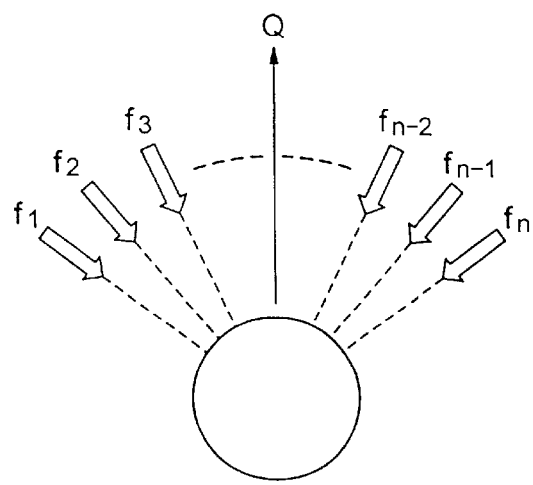
FIG. 5 is a diagram showing face directions $f_1$ to $f_n$ of a user which are indicated by face direction data FD.

Sample face image data $SF_1$ to $SF_n$ which were acquired by capturing the face of the driver from directions $f_1$ to $f_n$ respectively while the user was directing the visual line to a direction Q as shown in FIG. 5 are stored in a sample face image memory 346 beforehand.

The face direction detector 342 first compares the face image data FI supplied from the head-part extractor 341 with each of the sample face image data $SF_1$ to $SF_n$ stored in the sample face image memory 346. Next, the face direction detector 342 selects the sample face image data SF that is closest to the face image data FI from the sample face image data $SF_1$ to $SF_n$. Then, the face direction detector 342 supplies each of a utterance duration detector 344 and a mouth-shape-change analyzer 345 with the capturing direction (one of $f_1$ to $f_n$) of the selected sample face image data SF as face direction data FD indicating the direction of the face of the driver.

The mouth-part extractor 343 supplies each of the utterance duration detector 344 and the mouth-shape-change analyzer 345 with mouth image data MI which is acquired by extracting only the portion corresponding to the mouth of the driver from the face image data FI supplied from the head-part extractor 341. The extraction of the portion corresponding to the mouth is accomplished by separating the skin portion of the face from the lip portion by binarizing the face image data FI with a predetermined second threshold value.

Figure 6:
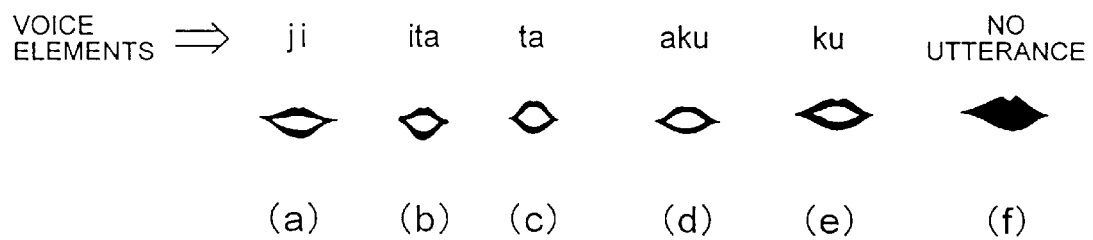
FIG. 6 is a diagram showing one example of changes in mouth shape at the time of uttering a vocal-manipulation phrase "jitaku" (which means "home" in English)

Sample mouth image data groups $SMG_1$ to $SMG_n$ which have been sampled from the user are stored in a sample mouth image memory 347 in advance. For example, the sample mouth image data group $SMG_2$ corresponds to the mouth portion acquired by capturing the driver from the direction $f_2$ at the time the user was making a predetermined sample utterance facing in the direction Q as shown in FIG. 5. At this time, individual pieces of sample mouth image data in the sample mouth image data group $SMG_2$ and stored in the sample mouth image memory 347 in association with the respective voice elements. For the sample utterance "jitaku", for example, individual pieces of sample mouth image data corresponding to mouth shapes (a) to (e) are stored in the sample mouth image memory 347 in association with respective voice elements "ji", "ita", "ta", "aku" and "ku" respectively as shown in FIG. 6. Also stored in the sample mouth image memory 347 is sample mouth image data corresponding to a mouth shape (f) which was acquired by capturing the user from each of the directions $f_1$ to $f_n$ shown in FIG. 5 when the user was not uttering a word.

The utterance duration detector 344 first reads out from the sample mouth image memory 347 the sample mouth image data group SMG that corresponds to the direction (one of $f_1$ to $f_n$) that is indicated by the face direction data FD. Next, every time the mouth image data MI is supplied from the mouth-part extractor 343, the utterance duration detector 344 determines if the mouth image data MI coincides with sample mouth image data corresponding to the state of non-utterance (the mouth shape (f)) in the sample mouth image data group SMG that has been read out in the above-described manner. When transition from a state where both data match with each other to an unmatched state is detected, the utterance duration detector 344 determines this point of detection as a talk start point. At this time, the utterance duration detector 344 stores the time of that talk start point as a talk start time $S_V$ in an internal register (not shown). Meanwhile, when transition from the state where both data do not match with each other to the matched state is detected, on the other hand, the utterance duration detector 344 determines this point of detection as a talk end point, and stores the time of that talk end point as a talk end time $E_V$ in the internal register. Then, the utterance duration detector 344 supplies the voice recognition controller 322 with utterance duration information $(S_V, E_V)$ indicating the talk start time $S_V$ and the talk end time $E_V$.

The mouth-shape-change analyzer 345 first reads out from the sample mouth image memory 347 sample mouth image data group SMG that corresponds to the direction (one of $f_1$ to $f_n$) indicated by the face direction data FD. Next, every time the mouth image data MI is supplied from the mouth-part extractor 343, the mouth-shape-change analyzer 345 searches the sample mouth image data group SMG for the sample mouth image data that is closest to the mouth image data MI. At this time, the mouth-shape-change analyzer 345 counts transition of the searched sample mouth image data has changed to sample mouth image data different from the previously searched one within the time that is indicated by the utterance duration information $SP_V$, and sends the count as the number-of-mouth-shape-change information $M_V$ to the voice recognition controller 322. That is, the mouth-shape-change analyzer 345 acquires the count of changes in the user's mouth shape within the time indicated by the utterance duration information $SP_V$ on the basis of the mouth image data MI, and sends the count as the number-of-mouth-shape-change information $M_V$ to the voice recognition controller 322.

Figure 7:
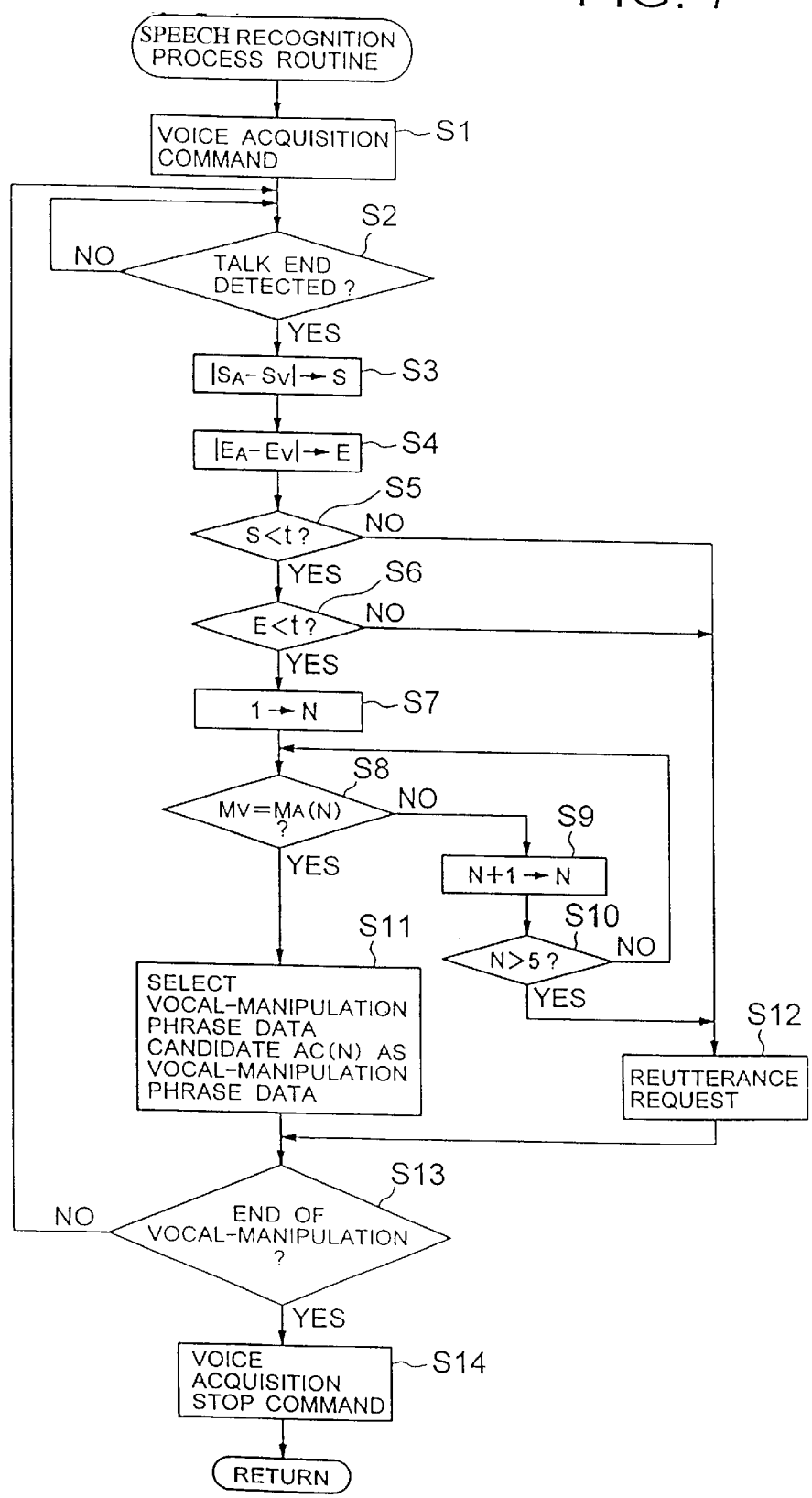
FIG. 7 is a flowchart illustrating a voice recognition output control flow.

Upon receiving the vocal-manipulation start signal from the talk switch 33, the voice recognition controller 322 initiates control according to a voice recognition process routine as shown in FIG. 7.

In FIG. 7, first, the voice recognition controller 322 generates a voice acquisition command signal and sends it to the voice acquisition circuit 321 (step S1). In accordance with the voice acquisition command signal, the voice acquisition circuit 321 starts acquiring the voice signal supplied from the microphone 31 and sends the voice signal to the utterance duration detector 323 and the voice recognition processor 324. Then, the voice recognition controller 322 determines if the talk end detection signal END has been supplied from the utterance duration detector 323 until the talk end detection signal END is supplied (step S2). That is, it is determined in step S2 whether or not voice acquisition of one utterance from the talk start to the talk end has been completed. During this period, the utterance duration detector 344 detects the duration of utterance made by the user on the basis of the mouth image data MI supplied from the mouth-part extractor 343, the sample mouth image data group SMG and the face direction data FD and sends the acquired utterance duration information $(S_V, E_V)$ to the voice recognition controller 322. During that period, the utterance duration detector 323 detects the duration of utterance made by the user on the basis of the voice signal supplied from the voice acquisition circuit 321 and supplies the voice recognition controller 322 with the talk end detection signal END indicating the end of utterance and the utterance duration information $(S_A, E_A)$. When it is determined in this step S2 that the talk end detection signal END has been supplied, the voice recognition controller 322 acquires the absolute value of the difference between the talk start time $S_A$ and the talk start time $S_V$ based on the utterance duration information $(S_V, E_V)$ and $(S_A, E_A)$ and stores the absolute value in an internal register S (not shown) (step S3). Then, the voice recognition controller 322 acquires the absolute value of the difference between the talk end time $E_A$ and the talk end time $E_V$ based on the utterance duration information $(S_V, E_V)$ and $(S_A, E_A)$ and stores the absolute value in an internal register E (not shown) (step S4). Next, the voice recognition controller 322 determines whether or not the value stored in the internal register S is smaller than a predetermined value t (step S5). That is, it is determined in step S5 if the difference between the talk start time $S_A$ determined from the level of the voice signal and the talk start time $S_V$ determined from the mouth shape when the voice signal is generated is small enough to lie within the predetermined value t. When it is determined in step S5 that the value stored in the internal register S is smaller than the predetermined value t, i.e., that the talk start time $S_A$ determined from the level of the voice signal and the talk start time $S_V$ determined from the mouth shape are close to each other, the voice recognition controller 322 then determines whether or not the value stored in the internal register E is smaller than the predetermined value t (step S6). That is, it is determined in step S6 if the talk end time $E_A$ determined from the level of the voice signal approximately coincides with the talk end time $E_V$ determined from the mouth shape when the voice signal is generated. When it is determined in step S6 that the value stored in the internal register E is smaller than the predetermined value t, i.e., that the talk end time $E_A$ determined from the level of the voice signal and the talk end time $E_V$ determined from the mouth shape approximately match with each other, the voice recognition controller 322 stores "1" as the initial value of count N in an internal register (not shown) (step S7). Then, the voice recognition controller 322 determines if the number-of-mouth-shape-change information $M_A(N)$ indicated by the count value N coincides with the number-of-mouth-shape-change information $M_V$ (step S8). That is, it is determined in step S8 whether or not $M_A(N)$ indicating the number of mouth shape changes previously acquired as shown in FIG. 2 in association with a vocal-manipulation phrase data candidate AC(N) which has been acquired through voice recognition coincides with $M_V$ indicating the count of mouth shape changes acquired as a result of analyzing the mouth shape of the user that were actually photographed at the time of uttering words.

When it is determined in step S8 that the number-of-mouth-shape-change information $M_A(N)$ does not match with the number-of-mouth-shape-change information $M_V$, the voice recognition controller 322 increments the count value N stored in the internal register by "1" and overwrites the old count N with the new count N in the internal register (step S9). Then, the voice recognition controller 322 determines if the count N stored in the internal register is larger than "5" (step S10). That is, it is determined in step S10 whether or not the count value N has exceeded "5" which is the total number of pieces of number-of-mouth-shape-change information $M_A1$ to $M_A5$. When it is determined in step S10 that the count N is not larger than "5", the voice recognition controller 322 returns to step S8 and repeatedly executes the above-described operation. In the meantime, when it is determined in step S8 in the sequence of processes that the number-of-mouth-shape-change information $M_A(N)$ matches with the number-of-mouth-shape-change information $M_V$, the voice recognition controller 322 selects the vocal-manipulation phrase data candidate AC(N) indicated by the count N as final vocal-manipulation phrase data and sends it to an operation code converter 350 (step S11). The operation code converter 350 generates an operation code corresponding to the supplied vocal-manipulation phrase data and sends the operation code to the system controller 20. The system controller 20 executes an operation according to the operation code.

By executing steps S8 to S11, first, the vocal-manipulation phrase data candidate AC which is assigned with the count of mouth shape changes $M_A$ equal to the number-of-mouth-shape-change $(M_V)$ that was acquired based on mouth image data obtained by actually capturing the mouth of the user at the time of uttering words is selected from the vocal-manipulation phrase data candidates AC1 to AC5. Then, the selected vocal-manipulation phrase data candidate AC is treated as the final vocal-manipulation phrase data.

Since final vocal-manipulation phrase data is selected by referring to the number of mouth shape changes obtained on the basis of the mouth image data of the user at the time of uttering words, the voice recognition accuracy can be enhanced even in a noisy environment.

When it is determined in step S5 that the talk start time $S_A$ is not close to the talk start time $S_V$, or when it is determined in step S6 that the talk end time $E_A$ is not close to the talk end time $E_V$, the voice recognition controller 322 supplies the system controller 20 with a reutterance request signal to request the user to reutter words (step S12). In response to the reutterance request signal, the system controller 20 controls the driving of the display device 12 and the voice generating unit 13 so as to show a message prompting the user to reutter words. The step S12 is executed also when it is determined in step S10 that the count N is larger than "5".

After execution of step S11 or step S12, the voice recognition controller 322 determines if the vocal-manipulation end signal has been supplied from the talk switch 33 (step S13). When it is determined in step S13 that the vocal-manipulation end signal has not been supplied, the voice recognition controller 322 returns to step S2 and repeatedly executes the above-described operation. That is, the voice recognition process for the next utterance is carried out. Meanwhile, when it is determined in step S13 that the vocal-manipulation end signal has been supplied, the voice recognition controller 322 generates the voice acquisition stop command signal and sends the signal to the voice acquisition circuit 321 (step S14). With the execution of As step S14, the voice acquisition circuit 321 stops acquiring the voice signal from the microphone 31. After execution of step S14, the voice recognition controller 322 leaves the voice recognition process routine and returns to an unillustrated main routine.

In the control illustrated in FIG. 7, as apparent from the foregoing description, it is determined whether or not the utterance duration information $(S_A, E_A)$ acquired on the basis of the level of the voice signal generated by the user significantly differs from the utterance duration information $(S_V, E_V)$ acquired by capturing the mouth of the user at the time of uttering words (steps S3 to S6). When they approximately coincide with each other, final vocal-manipulation phrase data is selected based on the vocal-manipulation phrase data candidate AC that is acquired by the voice recognition processor 324 (step S11), and the operation code that corresponds to the vocal-manipulation phrase data is acquired (by the operation code converter 350) and is sent to the system controller 20. Meanwhile, when both utterance duration information are not approximate to each other, selection of vocal-manipulation phrase data in step S11 is not performed but the user is requested to reutter words (step S12) instead.

That is, the operation code corresponding to the vocal-manipulation phrase data is sent to the system controller 20 only when the utterance duration information $(S_A, E_A)$ acquired based on the level of the voice signal generated by the user approximately coincides with the utterance duration information ($S_V$, $E_V$) acquired based on images obtained by capturing the mouth of the user at the time of uttering words. In other words, when the utterance duration acquired based on the level of the voice signal significantly differs from the utterance duration acquired based on mouth image data obtained by capturing the mouth of the user at the time of uttering words, it is determined that noise which may result in erroneous recognition is superimposed on the voice signal, so that the result of voice recognition at this time is discarded.

The above-described voice recognition operation prevents an erroneous manipulation originated from erroneous voice recognition which may result from various kinds of noise.

While the operation starting at step Si in the control shown in FIG. 7 is triggered by the talk start signal supplied from the talk switch 33, the operation starting at step S1 may be triggered by the direction of the face of the user. That is, when the direction (one of $f_1$ to $f_n$) indicated by the face direction data FD supplied from the face direction detector 342 falls within a predetermined directional range (e.g., $f_3$ to $f_{n-2}$), it is determined that the user starts uttering words and the operation starting at step Si is automatically initiated.

According to the invention, as described above, vocal-manipulation phrase data as a result of voice recognition is designed to be output only when the utterance duration that is acquired based on the level of a voice signal generated by an operator approximately coincides with the utterance duration that is acquired based on mouth image data obtained by capturing the mouth of the user. According to the invention, a vocal-manipulation phrase data candidate which is assigned with the count of mouth shape changes equal to or close to the count of mouth shape changes that is acquired based on the mouth image data is designed to be selected from a plurality of vocal-manipulation phrase data candidates obtained by voice recognition and to be output as the final voice recognition result.

In short, the invention provides accurate voice recognition results even under influence of various kinds of noise, so that an erroneous manipulation originated from erroneous voice recognition is prevented.

This application is based on a Japanese Patent Application No. 2000-276123 which is hereby incorporated by reference.

What is claimed is:

1. A speech recognition apparatus for recognizing speech uttered by an operator, comprising:
    a portion for performing a speech recognition process on a voice signal corresponding to said speech to thereby acquire vocal phrase data indicating the uttered phrase;
    a portion for detecting a point of time when said operator has started uttering said speech and a point of time when said operator has ended uttering said speech on the basis of a signal level of said voice signal to thereby output first utterance duration information;
    a portion for capturing a mouth of said operator to acquire mouth image data;
    a portion for detecting a point of time when said operator has started uttering said speech and a point of time when said operator has ended uttering said speech on the basis of said mouth image data to thereby output second utterance duration information; and
    a controller for outputting said vocal phrase data as long as said first utterance duration information is approximate to said second utterance duration information.

2. A speech recognition apparatus for recognizing speech uttered by an operator to thereby acquire vocal phrase data representing a phrase indicated by said speech, comprising:
    a portion for performing a speech recognition process on a voice signal corresponding to said speech to thereby acquire a plurality of vocal phrase data candidates;
    a portion for detecting a point of time when said operator has started uttering said speech and a point of time when said operator has ended uttering said speech on the basis of a signal level of said voice signal to thereby generate first utterance duration information;
    a portion for capturing a mouth of said operator to acquire mouth image data;
    a portion for detecting a point of time when said operator has started uttering said speech and a point of time when said operator has ended uttering said speech on the basis of said mouth image data to thereby generate second utterance duration information;
    a portion for counting the number of changes in a shape of said mouth in a duration of utterance indicated by said second utterance duration information on the basis of said mouth image data to thereby generate number-of-mouth-shape-change information; and
    a portion for selecting that one of said vocal phrase data candidates which has a count of changes in said mouth equal to the count indicated by said number-of-mouth-shape-changes information and outputting said selected vocal phrase data candidate as said vocal phrase data, as long as said first utterance duration information is approximate to said second utterance duration information.

3. A speech recognition apparatus for recognizing words uttered by a speaker, comprising:
    a first detection circuit which detects a talk start time and a talk end time of the speaker on the basis of a speech signal, and thereafter outputs first utterance duration information;
    a second detection circuit which detects a talk start time and a talk end time of the speaker on the basis of mouth image data, and thereafter outputs second utterance duration information; and
    a controller which receives the outputted first and second utterance duration information and compares at least a portion of the first utterance duration information to at least a portion of the second utterance duration information.

4. A speech recognition apparatus for recognizing words uttered by a speaker according to claim 3, further comprising:
    a processing circuit which determines the number of mouth shape changes of the speaker on the basis of the speech signal and thereafter outputs first mouth shape change information to the controller; and
    an analyzing circuit which determines the number of mouth shape changes of the speaker on the basis of the mouth image data and thereafter outputs second mouth shape change information to the controller.

5. A speech recognition apparatus for recognizing words uttered by a speaker according to claim 4, wherein, when the controller determines that the first utterance duration information and second utterance duration information have a certain relationship, the controller compares the first mouth shape change information to the second mouth shape change information.

6. A speech recognition apparatus for recognizing words uttered by a speaker according to claim 5, wherein, when the controller determines that the first mouth-shape change information and the second mouth shape change information do not have a certain relationship, the controller outputs a signal requesting the speaker to reutter the words.

7. A speech recognition apparatus for recognizing words uttered by a speaker according to claim 5, wherein, when the controller determines that the first utterance duration information and the second utterance duration information do not have a certain relationship, the controller outputs a signal requesting the speaker to reutter the words.

8. A speech recognition apparatus for recognizing words uttered by a speaker according to claim 5, further comprising a circuit which acquires vocal phrase data corresponding to the words uttered by the speaker.

9. A speech recognition apparatus for recognizing words uttered by a speaker according to claim 8, wherein, when the controller determines that the first mouth shape change information and the second utterance duration information have a certain relationship, the controller outputs said vocal phrase data.

10. A speech recognition apparatus for recognizing words uttered by a speaker according to claim 9, wherein, when the controller determines that the first mouth shape change information and the second utterance duration information do not have a certain relationship, the controller outputs a signal requesting the speaker to reutter the words.

11. A speech recognition apparatus for recognizing words uttered by a speaker according to claim 3, wherein, when the controller determines that the first utterance duration information and the second utterance duration information do not have a certain relationship, the controller outputs a signal requesting the speaker to reutter the words.

12. A speech recognition apparatus for recognizing words uttered by a speaker according to claim 3, further comprising a circuit which acquires vocal phrase data corresponding to the words uttered by the speaker.

13. A speech recognition apparatus for recognizing words uttered by a speaker according to claim 12, wherein, when the controller determines that the first utterance duration information and the second utterance duration information have a certain relationship, the controller outputs said vocal phrase data.

* * * * *